Patented Apr. 7, 1931

1,800,041

UNITED STATES PATENT OFFICE

ARNOLD J. ZURFLIEH, OF SCRANTON, PENNSYLVANIA

SETTING WAX

No Drawing. Application filed June 13, 1929. Serial No. 370,757.

The invention is a new and improved cement or wax for setting closet bowls upon the usual floor flanges, and it aims to provide a wax which will not harden or crack but will remain permanently viscous and pliable, producing a water and gas-tight joint throughout the life of the bowl.

A further object is to provide a wax which will not stain any tile, woodwork, stone, etc., with which it comes in contact.

The wax in its preferred form embodies paraffin, hydrocarbon oil, gum, an amphibolic filler, a preservative, a pigment and an insecticide. If desired however, the pigment and insecticide could of course be omitted.

The paraffin and hydrocarbon oil prevent the wax from drying. They are preferably obtained previously mixed into a fatty, semi-solid compound and the best results are obtainable when such compound is petrolatum A or B, the best petrolatum obtainable, being the same as used by pharmacists in compounding different ointments. This compound is stainless.

The gum insures a tight joint. It is preferably composed of ordinary rosin, white or light grade preferred, and is also stainless.

The amphibolic filler imparts the necessary body to the wax. It may be of asbestos, magnesia, a mixture of both, or any other suitable amphibolic mineral or minerals. It is ground and screened to remove all grit, sand and other hard particles which would prevent proper seating of the bowl. This filler like the other ingredients is stainless.

The preservative is preferably benzoic acid and it also is stainless.

For the pigment, zinc oxide may be used without danger of staining contacting or contiguous parts.

For the insecticide, boracic acid is appropriate. It is stainless and acts as a repellant for roaches and the like.

The best proportions of the preferred ingredients are given below by weight and such ingredients are mixed in any appropriate way.

8 ounces petrolatum.
5 ounces rosin.
¼ ounce paraffin, for consistency.
¼ ounces benzoic acid.
2 ounces asbestos.
1 ounce zinc oxide.
72 grains boracic acid.

The improved wax is far superior to putty, asbestos rings, rubber gaskets, etc. now commonly used in setting closet bowls. Putty saturates any contacting absorptive surfaces with oil and discolors them and it soon becomes hard and cracks; the fabric coverings on the asbestos rings soon rot, and the rubber gaskets also deteriorate, and hence, water and gas leakage are permitted. The wax herein disclosed makes a permanently tight joint. It does not dry or harden but remains permanently viscous and pliable, and whenever it is necessary to remove the bowl for any cause, it may be reset with the same wax, as such wax is permanent in all of its characteristics. Moreover, it will not stain any parts with which it comes in contact, a characteristic of extreme importance in the artistically decorated and colored bathrooms and the like of today.

In addition to the primary use of the invention herein described, I have found that it is usable to excellent advantage as a soldering flux. Hence, the plumber equipped with the wax need carry no other compound for soldering purposes.

I claim:—

1. A permanently soft and viscous setting wax composed of petrolatum, rosin, paraffin, triturated amphibolic filler, and a preservative.

2. A permanently soft and viscous setting wax composed of petrolatum, rosin, paraffin, triturated amphibolic filler, and benzoic acid.

3. A permanently soft and viscous setting wax composed of the following ingredients in substantially the proportions given: 8 ounces petrolatum, 5 ounces rosin, ¼ ounce paraffin, ¼ ounce benzoic acid, and 2 ounces triturated amphibolic filler.

In testimony whereof I have hereunto affixed my signature.

ARNOLD J. ZURFLIEH.